2,971,957
CITRAZINIC ACID-AMMONIA-OXYGEN DYES

Frederick L. Thomas, 609 Piper Drive, Madison, Wis.

No Drawing. Filed Oct. 23, 1958, Ser. No. 769,062

10 Claims. (Cl. 260—295)

This invention relates to methods for making citrazinic acid-ammonia dyes and compositions and compounds produced by such methods.

It has been known that citrazinic acid salts give a characteristic blue or green color. However, such color was not isolated and was considered solely as the property of the neutral salts of citrazinic acid itself.

Also, it has been known that citrazinic acid forms useful dyes when coupled with diazo compounds. The present invention in no way refers to dyes made by the diazo process or diazotization.

An object of this invention is to provide a method for the production of dyes inexpensively and in good yield.

An additional object is the production of dyes which may be used advantageously and inexpensively as water soluble colors for crayons, and water colors, inks, paint pigments and lacquers. By reason of its oxidizing potential and complete water solubility certain of the combinations of citrazinic acid amines should also prove useful as bleaching or whitening agents for laundering textiles, as bacteriostats, as analytical reagents for detection of presence of an amino group in complex organic compounds, and numerous other uses.

Other objects and advantages of the invention will be apparent from the following detailed description.

It was previously believed that color formed when sodium citrazinate reacted with air. It was not known that the reason the color formed is employed in the color formation in two distinct ways because of its nitrogen atom. I have discovered that citrazinic acid (2,6-dihydroxy-4-carboxy pyridine), or its ionic form in solution can combine with any nitrogen atom of ammonia or an ammonium salt. Because citrazinic acid itself has such a nitrogen atom it can combine with itself as a bimolecular reaction with respect to citrazinic acid to form the dye complex. The dye complex does not derive from sodium citrazinate because of a reaction with the air and water which is monomolecular with respect to the acid. As hereinafter shown the dye complex formed in the oxidation of sodium citrazinate is a special case, which fits within the rules governing dye complex formation.

I have further discovered a process for making novel dye compositions from citrazinic acid and ammonia or its salts in any concentration from dilute to concentrated (concentrated ammonia: sp. gr. 0.9; 27–30% of $NH_3$ by weight) and hydrogen peroxide from 0.5% to 30% in strength. Higher strengths of peroxide are not as desirable since the peroxides must be destroyed quickly, to prevent a change of the color and peroxidation.

In a specific example of my invention one gram of citrazinic acid is dissolved in 7 mls. of concentrated ammonia (15 Normal) to which 4 mls. of 3% peroxide with an inhibitor such as acetanilid are added. Solution is facilitated if the peroxide is added before complete solution is obtained. The pH may range from 4 to 11. A bright blue color is rapidly formed. The solution is poured into a shallow container and the excess ammonia evaporated at a temperature of between 40° C. and 50° C.

After one hour the solution is diluted with water and decanted. The residue is rinsed and weighed as a yellow cake and identified as citrazinic acid. The yield based on unconverted acid is approximately 80%. If the solution is allowed to evaporate the blue compound is formed. This compound will decompose with loss of weight and evolution of ammonia at an increasing rate with increased temperature, which is pronounced at 130° C. The solution freshly prepared does not produce a precipitate with bivalent and trivalent chlorides. However, after evaporation to dryness a precipitate is formed with these salt solutions which brings down less than 50% of the dye. This precipitate retains the same bright blue color as the dye. The precipitate, washed free of chlorides, retains the bright blue color at 300° C.

Salts of ammonia may also be reacted with citrazinic acid. For example, ammonium acetate and ammonium oxalate both form dyes when employed in ratios of from 2 to 3 moles of the ammonium salt to one of citrazinic acid and ⅓ mole of peroxide.

In other cases the ammonium salt of strong mineral acids can be employed as for example ammonium nitrate, ammonium chloride, or ammonium phosphate, either mono or dibasic. The ratios employed are two to three moles of ammonium salt to one of citrazinic acid to .05 to .5 mole of peroxide. With ammonium salts I have found that in some cases little or no peroxide is needed whereas with ammonia, itself, a peroxide is nearly always needed.

"Ammonium salts" as used in this application includes: ammonium acetate, ammonium oxalate, ammonium nitrate, ammonium chloride, ammonium phopshate, either mono or dibasic, unless otherwise stated.

Although, as stated, citrazinic acid can be used alone (and not as a soluble salt), I have found that the dye complex forms more quickly and with better results if a peroxide, either organic or inorganic, and particularly hydrogen peroxide, is used in the process as an oxidizing agent.

Example I

Five parts of citrazinic acid (Chas. Pfizer & Co., Inc.), 31.5 parts of ammonia (15 Normal), and 20 parts of 3% hydrogen peroxide are mixed until complete solution. All parts are by weight. The solution is evaporated in a shallow vessel at 50° C. In one hour volatile matter was removed. Crystals and blue black precipitate of dye remain with unreacted acid. The dye is extracted in 200 parts of distilled water. Yellow residue remains, in weight of one part. Residue is citrazinic acid. Yield of dye based on original citrazinic acid: 80%.

Example II

One part by weight of citrazinic acid, 24.5 parts by weight of 1.5 normal ammonia dissolves to final pH of 7.8. 7½ parts of 3% hydrogen peroxide were added at 25° C. Blue color developed immediately. Added 12 parts by weight of 10% calcium chloride solution. Precipitate formed was less than 0.1 part. Evaporated solution to dryness at 80° C. Redissolved in water, less than one part of blue precipitate recovered by filtration. Analysis: 8.2% calcium. Indicated molecular weight of dye pigment complex: 487. Precipitate does not melt or lose color at boiling point of sulfuric acid in melting point tube; that is, in excess of 300° C. Reacidification regenerates blue color. Dye recovered: 0.24 part by weight.

Example III

One part by weight of citrazinic acid is mixed with 10 parts of 3% hydrogen peroxide. Ammonia gas is bubbled through solution until weight increases by 0.96 part. Color reverted to blue black after blue. Added one part of glacial acetic acid and color returned to intense blue. No residue obtained. Dye solution: 27.2% by weight.

Example IV

Same conditions were used as in Example I except equivalent weight of 30% hydrogen peroxide was added. Color changed to blue in less than one minute and then blue black. One percent sodium hydrosulfite solution was added until the blue color was brought back. Excess was removed by acidification with hydrochloric acid and the solution neutralized. No residue was obtained on acidification or making alkaline.

Example V 15.5 parts citrazinic acid, 20 parts ammonium oxalate, and 600 parts of water were adjusted to a pH between 4 and 6.5 with concentrated acetic acid. 150 parts of 3% hydrogen peroxide were added following by boiling. A strong blue color developed which darkened on standing.

Example VI

Treating a Multifiber Test Fabric Type I of the AATCC with a 1% liquor of the blue solid of the analysis given elsewhere in this application in distilled water for 15 minutes at 70° C. showed the color was fixed on all fabrics including Orlon 81, however none of the colors were fast to rinsing. On a separate strip exposure to ultraviolet light from a 25 watt lamp placed at one foot distance at 25° C. showed all colors slightly lighter except silk, more blue; cotton, more blue. All colors on the control and light exposed samples were light, dull blue. However by treating 34 parts by wt. of the blue solid with 10 parts by weight of conc. sulfuric acid (AR grade, sp. gr. 1.83–1.96, 96–98%). The mixture was mascerated to a red-brown paste which did not char. 20,000 parts of isopropyl alcohol and water (1:1) were added, dissolving all the solids, although in other trials water alone was sufficient. The solution was neutralized with NaOH and barium hydroxide was added until all the sulfate was precipitated. Type I test fabrics were dyed in the liquor which was now a pale straw color, by immersing for 5 minutes at 90–100° C., removing, rinsing in tap water (350 p.p.m. hardness) and drying on an aluminum plate placed on a hotplate with a surface temperature of 110 to 125° C. The colors were: wool, navy; viscose, pale grey blue; silk, black; nylon, pale grey blue; cotton, pale violet; acetate, pale blue. The fabrics were rinsed in 0.4% by weight $CaCl_2$ solution at 100°, rinsed in 0.1 N NaOH and then distilled water at 25° and then dried on an aluminum plate. The colors now were: wool, deeper blue-black; viscose, same; silk, deeper jet black; nylon, deeper dull blue; cotton, pale grey blue; acetate, pale blue violet. Soaking 18 hours in distilled water showed no change in color. Exposure to the ultraviolet lamp above for 72 hours produced no appreciable change.

Example VII 15.5 parts of citrazinic acid, 24 parts of ammonium hydroxide (29%), and 15 parts of peroxide of lauric acid (all parts by weight) were heated carefully until homogeneous. Dry workable particles of a blue paste were formed. Addition of the paste to 85% bleached sulfite wood pulp by warming with the pulp liquor and forming a mat by pressing on a screen gave a paper of pale blue color. After two years this color had not faded and was still fast to rinsing.

Therefore, it is seen the disclosure particularly forming the basis of this Letters Patent is the discovery adding to the prior art concerning the development of the blue color of neutral salts of citrazinic acid. Specifically, I have found that a separate nitrogen atom

combines with citrazinic acid in the presence of oxygen. Further, I have found the reaction is associated with an amine oxide or amine oxide hydrate structure of nitrogen

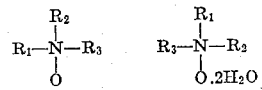

This compound combines directly with citrazinic acid to form the dye complex.

Although with ammonia where the R's in the above formulas are hydrogen the evidence for such an intermediate is lacking, nevertheless ammonia does not combine as the simple mono or diammonium salt of citrazinic acid under the conditions outlined in this application. For if an ammonium salt were to be formed, acidification with mineral acid would regenerate free, insoluble citrazinic acid from the ammonia, oxygen, citrazinic acid complex. This does not occur. Furthermore an analysis of the blue solid resulting from a preparation of the sort outlined in the examples gives the following (sample was equilibrated at 50% relative humidity and dried to constant weight over KOH):

|   | blue solid duplicate analysis | | calculated monoammonium salt | values for diammonium salt |
|---|---|---|---|---|
| Carbon | 37.33 | 38.08 | 37.90 | 34.78 |
| Hydrogen | 4.31 | 4.57 | 5.26 | 6.28 |
| Nitrogen | 19.39 | 20.59 | 14.70 | 20.28 |
| Oxygen (by Unterzaucher method) | 39.57 | 38.30 | 42.14 | 38.66 |
| Residue | 0.15 | 0.34 | | |

Lacquer formulations can be made directly from the dye solution by addition of a butanol and other lacquer resin solvents. With ethyl cellulose a water repellent coating is obtained when applied to cotton.

Citrazinic acid-ammonia dyes also can be made in accordance with my invention by incorporation of organic peroxides such as acetyl peroxide, peroxide of lauric acid, cyclohexyl methyl peroxide, ditertiary butyl peroxide and benzoyl peroxide. Such peroxides are preferred in the production of oil soluble amines and oil soluble dyes.

"Peroxide" as used in this application includes: hydrogen peroxide in water solution, acetyl peroxide, peroxide of lauric acid, cyclohexyl methyl peroxide, ditertiary butyl peroxide and benzoyl peroxide, unless otherwise stated.

The present application is a continuation-in-part of my co-pending application Serial No. 503,817, filed April 25, 1955, now abandoned.

It will be understood that the present invention is not confined to the precise methods and procedures nor the precise compositions and compounds as herein illustrated and described, but employs all modifications thereof within the scope of the following claims.

I claim:

1. The method for the preparation of 2,6-dihydroxy-4-carboxy pyridine-ammonia composition of matter which comprises, reacting 2,6-dihydroxy-4-carboxy pyridine with ammonia in the presence of a hydrogen peroxide water solution, heating, and removal of water by evaporation.

2. The method for the preparation of 2,6-dihydroxy-4-carboxy pyridine-ammonia composition of matter which comprises, reacting 2,6-dihydroxy-4-carboxy pyridine with an ammonium salt in the presence of a hydrogen peroxide water solution, heating, and removal of water by evaporation.

3. The method according to claim 2 wherein the ammonium salt is selected from the group consisting of ammonium acetate, ammonium oxalate, ammonium nitrate, ammonium chloride, and ammonium phosphate mono and dibasic.

4. The method for the preparation of 2,6-dihydroxy-4-carboxy pyridine-ammonia composition of matter which comprises, reacting 2,6-dihydroxy-4-carboxy pyridine with ammonia and water in the presence of a peroxide selected from the group consisting of acetyl peroxide, peroxide of lauric acid, cyclohexyl methyl peroxide, ditertiary butyl peroxide, benzoyl peroxide, and a peroxide solvent, heating, and removal of volatile matter by evaporation.

5. A method for making dyes which comprises, reacting citrazinic acid with ammonia in the presence of hydrogen peroxide and water, heating, and removal of water by evaporation.

6. The method of the preparation of 2,6-dihydroxy-4-carboxy pyridine-ammonia composition of matter which comprises, reacting 2,6-dihydroxy-4-carboxy pyridine with ammonia in the presence of a hydrogen peroxide water solution, exposing said reactants to the atmosphere and simultaneously heating the same, and removal of water by evaporation.

7. The method of claim 1 wherein the reaction occurs with the application of heat.

8. A composition of matter produced according to the method of claim 1 comprising, hydrogen, oxygen, at least 37% carbon, by weight and at least 19% nitrogen by weight when the analysis of the product is dried to constant weight over KOH and is corrected for residue.

9. The method for the preparation of 2,6-dihydroxy-4-carboxy pyridine-ammonia composition of matter which comprises, reacting 2,6-dihydroxy-4-carboxy pyridine with an ammonium salt in the presence of a hydrogen peroxide water solution, exposing said reactants to the atmosphere and simultaneously heating the same, and removal of water by evaporation.

10. A composition of matter produced according to the method of claim 2 comprising, hydrogen, oxygen, at least 37% carbon by weight and at least 19% nitrogen by weight when the analysis of the product is dried to constant weight over KOH and is corrected for the weight of the anion used to neutralize the ammonia before it is reacted and is further corrected for the residue.

References Cited in the file of this patent

Behrmann et al.: Ber. Deut. Chem., vol. 17, pp. 2687–2690 (1884).

Easterfield et al.: J. Chem. Soc. (London), vol. 61, p. 1008 (1892).

Sell et al.: J. Chem. Soc. (London), vol. 63, pp. 1035–1051 (1893).

Easterfield et al.: J. Chem. Soc. (London), vol. 65, pp. 28–31 (1894).